United States Patent
Dekel

(10) Patent No.: US 10,096,838 B2
(45) Date of Patent: *Oct. 9, 2018

(54) CHEMICAL BONDING FOR CATALYST/MEMBRANE SURFACE ADHERENCE IN MEMBRANE ELECTROLYTE FUEL CELLS

(75) Inventor: Dario Dekel, Zichron Yaakov (IL)

(73) Assignee: POCELL TECH LTD., Caesarea (IL)

( * ) Notice: Subject to any disclaimer, the term of this patent is extended or adjusted under 35 U.S.C. 154(b) by 1077 days.

This patent is subject to a terminal disclaimer.

(21) Appl. No.: 13/154,056

(22) Filed: Jun. 6, 2011

(65) Prior Publication Data

US 2011/0300466 A1    Dec. 8, 2011

Related U.S. Application Data

(60) Provisional application No. 61/352,009, filed on Jun. 7, 2010.

(51) Int. Cl.
*H01M 8/10* (2016.01)
*H01M 4/88* (2006.01)
*H01M 8/1018* (2016.01)
*H01M 8/1053* (2016.01)
*H01M 8/102* (2016.01)

(52) U.S. Cl.
CPC ......... *H01M 4/881* (2013.01); *H01M 8/1018* (2013.01); *H01M 8/1053* (2013.01); *H01M 4/8817* (2013.01); *H01M 8/102* (2013.01)

(58) Field of Classification Search
CPC ... H01M 8/083; H01M 8/0284; H01M 8/1004
USPC .......................... 429/465, 480, 482, 510, 535
See application file for complete search history.

(56) References Cited

U.S. PATENT DOCUMENTS

| | | |
|---|---|---|
| 3,909,206 A | 9/1975 | Katz |
| 4,191,453 A | 3/1980 | Beni et al. |
| 4,253,922 A | 3/1981 | Welch |
| 4,910,099 A | 3/1990 | Gottesfeld |

(Continued)

FOREIGN PATENT DOCUMENTS

| | | |
|---|---|---|
| EP | 1901379 A1 | 3/2008 |
| EP | 1965456 A1 | 9/2008 |

(Continued)

OTHER PUBLICATIONS

Drese et al., "Synthesis-Structure-Property Relationship for Hyperbranched Aminosilica CO2 Adsorbents", Advanced Functional Materials, 19:3821-3832 (2009).

(Continued)

*Primary Examiner* — Jimmy Vo
(74) *Attorney, Agent, or Firm* — Pearl Cohen Zedek Latzer Baratz LLP

(57) ABSTRACT

An alkaline membrane fuel cell including at least one of i) a catalyst coated OH— ion conducting membrane having a catalyst layer and an OH— ion conducting membrane, and ii) a catalyst coated carbonate ion conducting membrane having a catalyst layer and a carbonate ion conducting membrane, respectively, wherein the at least one catalyst layer is chemically bonded to a surface of the at least one membrane, wherein the chemical bonding is established by crosslinking of polymer constituents across an interface between the at least one catalyst layer and the at least one membrane.

5 Claims, 6 Drawing Sheets

(56) References Cited

U.S. PATENT DOCUMENTS

| | | | |
|---|---|---|---|
| 5,082,550 A | 1/1992 | Rishpon et al. | |
| 5,108,573 A | 4/1992 | Rubinstein et al. | |
| 5,227,042 A | 7/1993 | Zawodzinski et al. | |
| 5,366,821 A | 11/1994 | Merritt et al. | |
| 5,368,717 A | 11/1994 | Gottesfeld et al. | |
| 5,527,640 A | 6/1996 | Rudge et al. | |
| 6,140,466 A | 10/2000 | Barbas, III et al. | |
| 6,203,936 B1 | 3/2001 | Cisar et al. | |
| 6,221,523 B1 | 4/2001 | Chun et al. | |
| 6,242,568 B1 | 6/2001 | Barbas, III et al. | |
| 6,296,964 B1 | 10/2001 | Ren et al. | |
| 6,356,433 B1 | 3/2002 | Shi et al. | |
| 6,383,640 B1 | 5/2002 | Shi et al. | |
| 6,458,479 B1 | 10/2002 | Ren et al. | |
| 6,488,837 B1 | 12/2002 | Ren et al. | |
| 6,686,081 B2 | 2/2004 | Gottesfeld | |
| 6,696,382 B1 | 2/2004 | Zelenay et al. | |
| 6,821,658 B2 | 11/2004 | Acker et al. | |
| 6,824,899 B2 | 11/2004 | Acker et al. | |
| 6,841,283 B2 | 1/2005 | Breault | |
| 6,890,680 B2 | 5/2005 | Beckmann et al. | |
| 6,936,368 B2 | 8/2005 | Hirsch et al. | |
| 6,962,760 B2 | 11/2005 | Rice et al. | |
| 6,981,877 B2 | 1/2006 | Ren et al. | |
| 6,986,961 B1 | 1/2006 | Ren et al. | |
| 6,991,865 B2 | 1/2006 | Acker et al. | |
| 7,083,708 B2 | 8/2006 | Chlistunoff et al. | |
| 7,179,501 B2 | 2/2007 | Beckmann et al. | |
| 7,282,293 B2 | 10/2007 | Ren et al. | |
| 7,332,241 B2 | 2/2008 | Jaouen | |
| 7,407,721 B2 | 8/2008 | Ren et al. | |
| 7,510,794 B2 | 3/2009 | Gottesfeld et al. | |
| 7,541,109 B2 | 6/2009 | Ren et al. | |
| 7,638,215 B2 | 12/2009 | Ren et al. | |
| 8,304,368 B2 | 11/2012 | Gottesfeld et al. | |
| 2002/0034675 A1 | 3/2002 | Starz et al. | |
| 2002/0086193 A1 | 7/2002 | Acker et al. | |
| 2002/0122966 A1 | 9/2002 | Acker et al. | |
| 2003/0031907 A1 | 2/2003 | Gottesfeld | |
| 2003/0143448 A1 | 7/2003 | Keefer | |
| 2003/0157395 A1 | 8/2003 | Ren et al. | |
| 2003/0157396 A1 | 8/2003 | Beckmann et al. | |
| 2004/0023086 A1 | 2/2004 | Su et al. | |
| 2004/0062980 A1 | 4/2004 | Ren et al. | |
| 2004/0069144 A1 | 4/2004 | Wegeng et al. | |
| 2004/0076859 A1 | 4/2004 | Gottesfeld | |
| 2004/0166401 A1 | 8/2004 | Srinivas | |
| 2004/0191584 A1 | 9/2004 | Rice et al. | |
| 2004/0209136 A1 | 10/2004 | Ren et al. | |
| 2004/0209143 A1 | 10/2004 | Hirsch et al. | |
| 2004/0209154 A1 | 10/2004 | Ren et al. | |
| 2004/0265680 A1 | 12/2004 | Ren et al. | |
| 2005/0019638 A1 | 1/2005 | Ravikiran et al. | |
| 2005/0026005 A1 | 2/2005 | Chlistunoff et al. | |
| 2005/0053811 A1 | 3/2005 | Acker et al. | |
| 2005/0147862 A1 | 7/2005 | Knoop et al. | |
| 2005/0170224 A1 | 8/2005 | Ren et al. | |
| 2005/0181271 A1 | 8/2005 | Ren et al. | |
| 2005/0196666 A1 | 9/2005 | Gottesfeld et al. | |
| 2005/0227140 A1 | 10/2005 | Beckmann et al. | |
| 2006/0068271 A1 | 3/2006 | Ren et al. | |
| 2006/0266642 A1 | 11/2006 | Akle et al. | |
| 2006/0286429 A1 | 12/2006 | Shiepe et al. | |
| 2007/0128500 A1 | 6/2007 | Marsacq et al. | |
| 2008/0008921 A1 | 1/2008 | Miura | |
| 2008/0032182 A1 | 2/2008 | Ren et al. | |
| 2008/0115875 A1 | 5/2008 | Jeng et al. | |
| 2008/0145721 A1 | 6/2008 | Shapiro et al. | |
| 2008/0156549 A1 | 7/2008 | Leboe et al. | |
| 2008/0166542 A1 | 7/2008 | Sung et al. | |
| 2008/0184882 A1 | 8/2008 | White | |
| 2008/0187824 A1 | 8/2008 | Tomantschger | |
| 2008/0206616 A1 | 8/2008 | Atanassova et al. | |
| 2009/0004529 A1 | 1/2009 | Gur et al. | |
| 2009/0042092 A1 | 2/2009 | Martinent et al. | |
| 2010/0021777 A1 | 1/2010 | Gottesfeld et al. | |
| 2010/0047659 A1 * | 2/2010 | Miyama et al. | 429/33 |
| 2010/0081028 A1 * | 4/2010 | An et al. | 429/33 |
| 2010/0081029 A1 * | 4/2010 | Fukuta | H01M 8/0291 429/492 |
| 2010/0216052 A1 | 8/2010 | Gottesfeld et al. | |
| 2011/0026893 A1 | 2/2011 | Omori et al. | |
| 2011/0300466 A1 | 12/2011 | Dekel | |

FOREIGN PATENT DOCUMENTS

| | | | | |
|---|---|---|---|---|
| EP | 2224522 A1 | 9/2010 | | |
| JP | 2001229936 | 8/2001 | | |
| JP | 2007-042617 | 2/2007 | | |
| JP | 2007-048701 | 2/2007 | | |
| JP | 2009158128 | 7/2009 | | |
| JP | 2009158128 A | 7/2009 | | |
| WO | WO2007/004716 | 1/2007 | | |
| WO | WO 2007004716 A1 * | 1/2007 | | H01M 8/0291 |
| WO | WO2007/072842 | 6/2007 | | |
| WO | WO 2008114664 A1 * | 9/2008 | | |
| WO | WO-09081841 A1 | 7/2009 | | |
| WO | WO2014/165072 | 10/2014 | | |

OTHER PUBLICATIONS

Office Action for U.S. Appl. No. 14/204,057 dated Apr. 1, 2016.
Yuan-Cheng Cao et al.: "Preparation of alkaline anion exchange polymer membrane from methylated melamine grafted poly (vinylbenzyl chloride) and its fuel cell performance"; Journal of Materials Chemistry, vol. 21, No. 34, Jan. 1, 2011, p. 12910-12916, XP055285078, GB.
Extended European Search Report of EP Application No. 14778433. 4, dated Nov. 10, 2016.
Supplementary European Search Report for EP application No. EP13886585.2, dated Jan. 9, 2017.
Notice of Allowance of JP Application No. 2013-513778, dated Dec. 22, 2016.
Office action of Korean Patent Application No. 2012-7033148, dated Nov. 21, 2017.
B. S. Pivovar and Y. S. Kim, "The Membrane—Electrode Interface in PEFCs: I. A Method for Quantifying Membrane—Electrode Interfacial Resistance",J. Electrochem. Soc. 2007 , vol. 154(8): B739-B744;.
Y.S. Kim et al. "Non-NafionMembrane Electrode Assemblies", 2006 DOE OHFCIT program review, May 16, 2006.
T. Xu et. al, "Fundamental studies on a new series of anion exchange membranes: effect of simultaneous amination-crosslinking processes on membranes ion-exchange capacity and dimensional stability", Journal of Membrane Science , vol. 199 (2002) pp. 203-210.
J. Park et al., "Development of Solid-State Alkaline Electrolytes for Solid Alkaline Fuel Cells", Macromol. Symp. (2007), vol. 249-250, pp. 174-182, Mar. 28, 2007.
N. Robertson et al., "Tunable High Performance Cross-Linked Alkaline Anion Exchange Membranes for Fuel Cell Applications", J. Am. Chem. Soc., 2010, 132 (10), pp. 3400-3404.
C. Wu et al., "Novel anion-exchange organic-inorganic hybrid membranes prepared through sol-gel reaction and UV/thermal curing", Journal of Applied Polymer Science, 107 (2008), 1865-1871.
J.R. Varcoe and R.C.T. Slade, "An electron-beam-grafted ETFE alkaline anion-exchange membrane in metal-cation-free solid-state alkaline fuel cells", Electrochem Comm. vol. 8 (2006), 839-843,.

* cited by examiner

CHEMICAL BONDING FOR CATALYST/MEMBRANE SURFACE ADHERENCE IN MEMBRANE ELECTROLYTE FUEL CELLS

RELATED APPLICATIONS

This application claims the benefit of U.S. Provisional Application No. 61/352,009 filed Jun. 7, 2010, which is incorporated by reference herein in its entirety.

BACKGROUND

The quality of the bond between the catalyst layer (CL) and the membrane is an important parameter in membrane electrolyte fuel cell technology. The interfacial contact of the CL and the cell membrane has to be continuous to the nanometer scale in order to achieve effective catalyst utilization and to minimize internal cell resistance. The critical importance of the CL-cell membrane interface has been scarcely reported. Pivovar and Kim [J. Electrochem. Soc., 154 (8) B739-B744 (2007)] and Kim et al. [2006 DOE OHFCIT Program Review, May 16, 2006] have presented some details on the crucial significance of the quality of CL-cell membrane interface on the fuel cell performance. In the prior art, Polymer Electrolyte Membrane (PEM) fuel cell technology, the bond between catalyst and membrane is formed relatively readily, typically by hot-pressing a CL/membrane/CL combination or "sandwich"—the so called "CCM" (Catalyst-Coated Membrane). Because the perfluoro-carbon backbone of ionomers used in PEM fuel cells exhibits some thermoplasticity at temperatures below the chemical stability limit, the result of hot-pressing is typically inter-diffusion of the polymer components in the CL and in the surface of the membrane. Such inter-diffusion can generate bonding that can be described as zipping together of micro-fingers of polymeric material protruding from each side of the interface. This form of bonding can secure lasting interfacial adherence in CCMs for PEM fuel cells, typically surviving long term operation at high cell current densities and experiencing significant number of wet-dry cycles.

Wet-dry cycles can be a major challenge to the integrity of the interfacial bond because of the dimensional changes associated with water uptake by the dry polymer material. These dimensional changes can be expected to cause significant stress in the CL/cell membrane interface and could result in gradual delamination that takes place depending, for instance, on: (i) the intrinsic strength of the as-formed interfacial bond and (ii) the dissimilarity of dimensional changes during wet-dry cycles in the materials forming the interfacial bond. In the case of the PEM fuel cell which employs ionomers with perfluoro-carbon backbones, hot pressing under well-optimized pressure and temperature conditions can help to provide a CL/cell membrane interface of good adhesion and of well-matched dimensional changes on both sides of the interface during wet-dry cycles. The strength of the as-formed bond has been confirmed in peel-strength measurements.

In contrast, with ionomers having hydrocarbon, or crosslinked hydrocarbon backbones, such as, for example, in the anion-conducting polymers developed to date, the quality of the CL/membrane interfacial bond formed by hot-pressing a thin film of catalyst/ionomer composite onto the membrane surface, is significantly less satisfactory. One reason is the negligible thermoplasticity of polymers with hydrocarbon backbones. Such polymers with hydrocarbon backbones do not achieve inter-diffusion of ionomeric components across the interface during hot-pressing at relatively low temperatures, for instance at temperatures less than 100° C. Alkaline Membrane Fuel Cells (AMFCs) based on ionomers with hydrocarbon backbones, can therefore suffer delamination at the CL/membrane interface that can become a major cause of performance loss and can lead to complete cell failure. Clearly, the negligible thermoplasticity of the poly[hydrocarbon] ionomers employed in the AMFC membrane and CL calls for alternative methods and structures for securing high quality CL/membrane bonds.

Crosslinking can provide excellent chemical bonding between poly[hydrocarbon] chains. Various crosslinking methods were used in membrane preparation for AMFCs. Xu and Zha [J. Membrane Sci., 199 (2002) 203-210], Park et al. [Macromol. Symp. (2007) 249-250, 174-182] and Robertson et al. [J. Am. Chem. Soc. (2010), 132, 3400-3404] used different diamine compounds to crosslink the polymer in membranes for Alkaline Membrane Fuel Cell (AMFC). Although membranes with crosslinked polymers exhibited excellent mechanical strength, after crosslinking, the membrane surface becomes rigid with very poor surface properties. Similar crosslinking approach within the membrane was applied by Wu et al. [J. Appl. Polymer Sci., 107 (2008) 1865-1871] using UV/thermal curing instead of diamine compounds. Quality of the crosslinked membrane surface, however, did not allow applying a CL on the membrane surface, consequently obtaining inadequate CL-cell membrane-CL interface bond quality.

Similarly to the approach of crosslinking the polymer material in the membrane alone, Varcoe and Slade [Electrochem. Comm., 8 (2006) 839-843] have crosslinked the polymer in the CL alone and mechanically pressed the electrode with such crosslinked CL onto an anion exchange membrane. Similar to other earlier studies of AMFCs, they also obtained poor CL-cell membrane bonding and concluded that inadequate CL-cell membrane interfaces are major limiters of power performance in AMFCs.

In contrast to all those approaches, the present disclosure provides a method of chemically bonding together a CL and an alkaline cell membrane of an AMFC wherein a chemical bond is created across the interface between the CL and the membrane.

While this section of this application is labeled as "Background" Applicants provide this description as information that helps to explain the invention disclosed herein. Unless explicitly stated, Applicant does not concede that anything described in this section, or any other part of this application, is prior art, or was known before the date of conception of the invention described herein.

SUMMARY

In general, in an aspect, embodiments of the invention may provide an alkaline membrane fuel cell including at least one of i) a catalyst coated OH— ion conducting membrane having a catalyst layer and an OH— ion conducting membrane, and ii) a catalyst coated carbonate ion conducting membrane having a catalyst layer and a carbonate ion conducting membrane, respectively, wherein the at least one catalyst layer is chemically bonded to a surface of the at least one membrane, wherein the chemical bonding is established by crosslinking of polymer constituents across an interface between the at least one catalyst layer and the at least one membrane.

Implementations of the invention may include one or more of the following features. An overall crosslinking region includes at least some volume of the catalyst layer. An immobilized cation in the conducting membrane is based on at least one of quaternary phosphonium and quaternary ammonium groups. The crosslinking is established using diphosphines, triphosphines, monophosphine and diphosphines mixtures, diamines, triamines, monoamine and diamine mixtures, and any phosphine or amine having the general formula: (R1R2)X—R—X(R3R4) where X is a P or N atom, R1 and R2, R3 and R4 are C1-C6 alkyl groups, independent of each other or forming a ring with each other; and R includes a spacer in the molecular structure selected to optimize the length of the polymer molecule. The crosslinking is established through a thin film pre-applied between the catalyst layer and the conducting membrane. The crosslinking is based on ionic attractive forces introduced using a thin polymer film with acidic functions, placed between the catalyst layer and the conducting membrane. The crosslinking is established using UV activated crosslinking agents. The UV initiated crosslinking is established through a thin film pre-placed between the catalyst layer and the conducting membrane. The crosslinking is established using thermally activated crosslinking agents. The thermal initiated crosslinking is established through a thin film pre-placed between the catalyst layer and the conducting membrane.

In general, in an aspect, embodiments of the invention may provide a method of forming a catalyst-coated membrane for an alkaline membrane fuel cell, the method including chemically bonding a catalyst layer to at least one of an i) OH— ion conducting membrane, and ii) a carbonate ion conducting membrane, by establishing crosslinking of polymer constituents across an interface between the catalyst layer and a surface of the at least one membrane, pre-treating the at least one cell membrane surface by at least one of: i) roughening the at least one membrane surface using microparticle sand blasting, and ii) swelling of a portion of the at least one membrane surface by contacting the portion with a solvent suitable for inducing swelling.

Implementations of the invention may provide one or more of the following features. The method further includes basing an immobilized cation in the conducting membrane on at least one of quaternary phosphonium and quaternary ammonium groups. The method further includes crosslinking using diphosphines, triphosphines, monophosphine and diphosphines mixtures, diamines, triamines, monoamine and diamine mixtures, and any phosphine or amine having the general formula: (R1R2)X—R—X(R3R4) where X is a P or N atom, R1 and R2, R3 and R4 are C1-C6 alkyl groups, independent of each other or forming a ring with each other; and R includes a spacer in the molecular structure selected to optimize the length of the polymer molecule. The method further includes crosslinking through a thin film pre-applied between the catalyst layer and the conducting membrane. The crosslinking is based on ionic forces introduced using a thin polymer film with acidic functions, placed between the catalyst layer and the conducting membrane. Wherein crosslinking is established using UV activated crosslinking agents. Wherein crosslinking is established using thermally activated crosslinking agents.

Various methods and processes for chemically bonding catalyst layers to cell membranes of alkaline membrane fuel cells are provided and, more particularly, for creating chemical bonds across the interface between a catalyst layer and a surface of a cell membrane.

Applicants have developed two approaches to help to achieve high quality bonds at the interface of catalyst layers and cell membranes of AMFCs including: (1) a bond based on embedding solid catalyst particles into the membrane surface to generate "anchor sites" for a CL, and (2) a chemical bond created at the interface between a CL and a cell membrane and, more particularly, between the functional groups in the membrane surface and the counterpart functional groups at the near-(membrane) surface region of the recast ionomer(s) of the CL.

The former approach is disclosed in applicant's co-pending U.S. patent application Ser. No. 12/710,539 filed Feb. 23, 2010, which is incorporated by reference herein in its entirety, that discloses methods of applying a catalyst based on nano-metal particles to the hydrocarbon membrane surface. Such methods have been shown to generate high performance at minimal ionomer content in the CL. Such an ionomer-lean, nano-metal particle-rich catalyst likely bonds to a cell membrane via solid particle anchor sites embedded into the membrane surface when the catalyst coated membrane (CCM) is pressed.

The second approach is in accordance with the invention described below and includes creating and forming interfacial chemical bonds between cell membrane surface functionalities and recast ionomer counterpart functionalities. Such methods and processes to achieve chemical bonding at the CL/membrane interface are disclosed in the present application. The methods and processes according to the invention are generally disclosed and grouped in this Summary section, as provided below, with further details provided in the Detailed Description section by way of illustrative examples.

In general, in one aspect, the invention provides a method of bonding a CL and an alkaline cell membrane of an AMFC wherein a chemical bond is created across an interface between the CL and the membrane. In one embodiment of the invention, the method includes formulating a catalyst ink for application to a surface of the cell membrane that includes one or more components having crosslinking functionality. In one embodiment of the catalyst ink formulation according to the invention, the formulation includes one or more components having crosslinking functionality including, but not limited to, one or more diamines and/or triamines. In another embodiment of the invention, one or more components having crosslinking functionality may be also introduced into the cell membrane chemical structure. The method further includes applying or casting the catalyst ink formulation onto at least a portion of a surface of the cell membrane.

In another embodiment of the invention, a method of chemically bonding a CL and a cell membrane of an AMFC includes applying a thin film to a surface of the cell membrane prior to application of the catalyst ink, wherein the thin film chemical structure includes one or more components that will help to induce and generate crosslinking across the membrane/thin film/CL interface. The method includes applying the thin film to the membrane surface and applying or casting subsequently a catalyst ink formulation onto the thin film to form the CL and achieve crosslinking across the membrane/thin film/CL interface. In a further embodiment of the invention, a method of chemically bonding a CL and a cell membrane of an AMFC includes adding precursor functional groups to a catalyst ink formulation and/or to a thin film that has been pre-applied to a surface of the cell membrane. The method further includes, subsequent to applying or casting the catalyst ink formulation and/or the thin film and catalyst layer onto the membrane surface, curing of the interface with application of ultraviolet (UV) light or heat, to generate chemical bonding between the UV, or heat activated functional groups across the CL/membrane, or the CL/thin film/membrane interface.

In the embodiments described above, the method may include a pre-treatment of the cell membrane surface before applying a thin film to the surface. Such surface pre-treatment may include, but is not limited to, roughening the membrane surface via micro-particle sand blasting, and/or swelling of a portion or a region of the membrane surface via contacting the portion or region with one or more solvents suitable for inducing swelling under controlled application conditions such as DMF, n-propanol, i-propanol, DMAC, and THF.

DETAILED DESCRIPTION

The invention provides methods of chemically bonding a CL and a cell membrane of an alkaline membrane fuel cell (AMFC) at or across an interface of the CL and a surface of the cell membrane. Other embodiments are within the scope of the invention.

Figure 1:
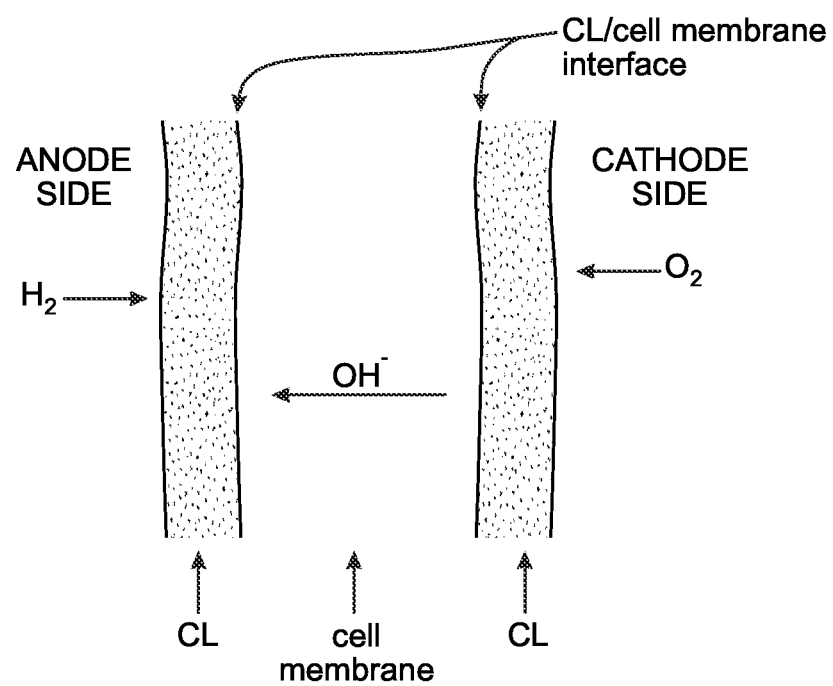
FIG. 1 is a schematic diagram of an AMFC.
Figure 2A:
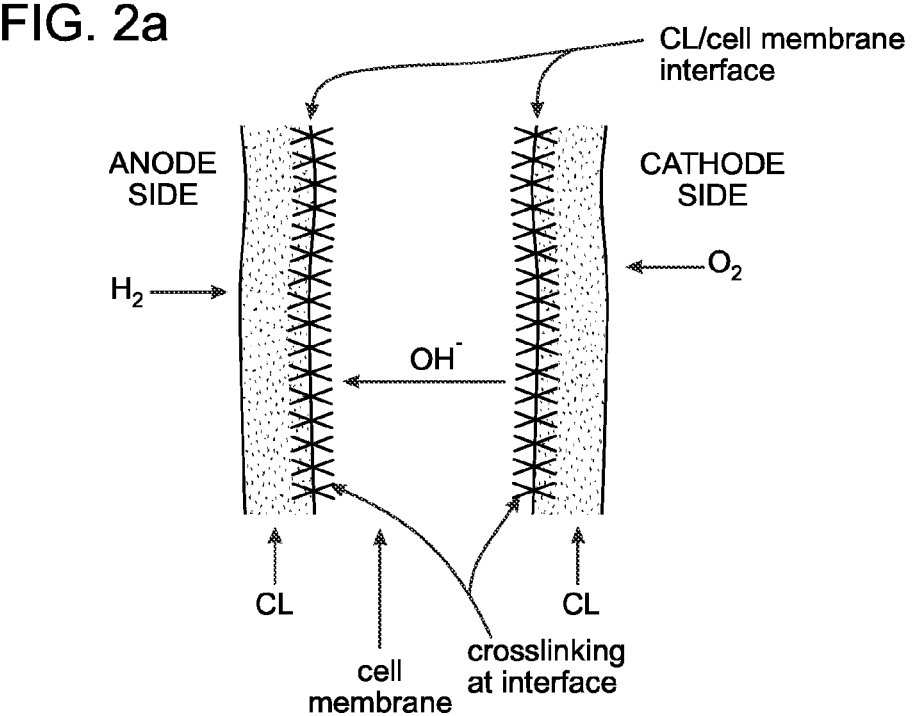
FIGS. 2a-2b are schematic diagrams of AMFCs with chemical bonding.
Figure 2B:
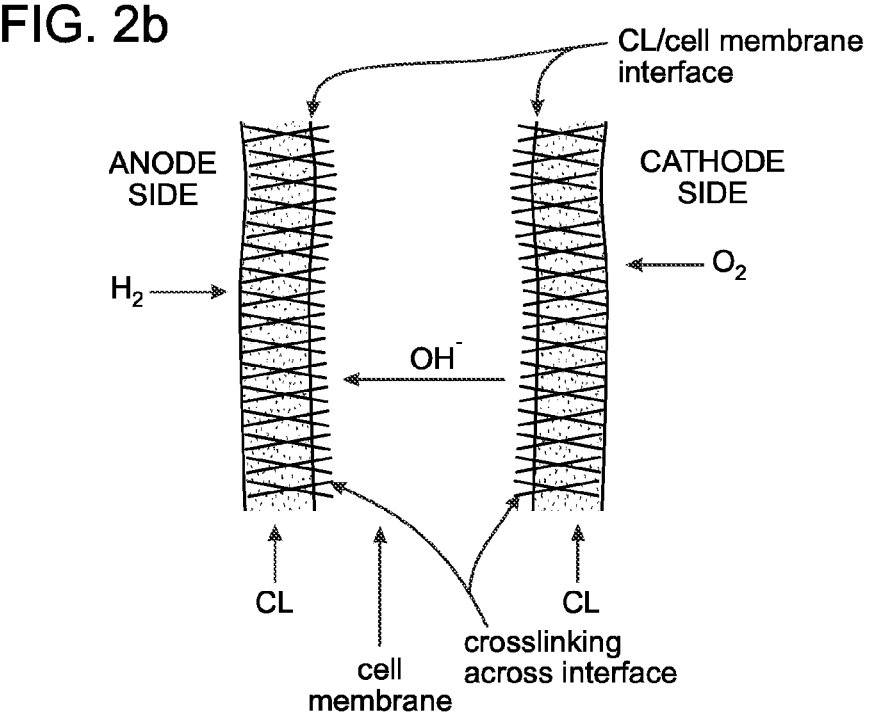

FIG. 1 shows a schematic diagram of an AMFC where the CL/membrane contact is established using thermo-mechanical tools alone. FIG. 2 shows a schematic diagram of an AMFC with chemical bonding between the CL and membrane surface in which the chemical bonding is across the CL-cell membrane interface, which may be confined to the interface alone (e.g., FIG. 2a) and/or also involve some volume of the catalyst layer (e.g., FIG. 2b).

Below are descriptions of examples of the methods and processes according to the invention and are provided as illustrative examples only and are not intended to limit the scope of the invention as described herein.

As used herein, "alkyl", "$C_1$, $C_2$, $C_3$, $C_4$, $C_5$ or $C_6$ alkyl" or "$C_1$-$C_6$ alkyl" is intended to include $C_1$, $C_2$, $C_3$, $C_4$, $C_5$ or $C_6$ straight chain (linear) saturated aliphatic hydrocarbon groups and $C_3$, $C_4$, $C_5$ or $C_6$ branched saturated aliphatic hydrocarbon groups. For example, $C_1$-$C_6$ alkyl is intended to include $C_1$, $C_2$, $C_3$, $C_4$, $C_5$ and $C_6$ alkyl groups. Examples of alkyl include, moieties having from one to six carbon atoms, such as, but not limited to, methyl, ethyl, n-propyl, i-propyl, n-butyl, s-butyl, t-butyl, n-pentyl, s-pentyl or n-hexyl.

In certain embodiments, a straight chain or branched alkyl has six or fewer carbon atoms (e.g., $C_1$-$C_6$ for straight chain, $C_3$-$C_6$ for branched chain), and in another embodiment, a straight chain or branched alkyl has four or fewer carbon atoms.

In one embodiment, the alkyl group may be chemically linked to the backbone of the ionomers of the CL. For example, the alkyl group may be chemically linked to the hydrocarbon backbone of the ionomers of the CL.

In another embodiment, the alkyl group may be chemically linked to polymer structure of the membrane. For example, the alkyl group may be chemically linked to the hydrocarbon backbone of the membrane.

As used herein, "chemically linked," for example, refers to any manner in which the alkyl group may be linked to the backbone of the ionomers of the CL or the backbone of the polymer structure of the membrane. For example, the alkyl group may be linked to the backbone of the ionomers of the CL or the backbone of the polymer structure of the membrane through a chemical bond, e.g., a C—C bond.

As used herein, "spacer" or "a spacer group", is, for example, intended to include any group known in the art used to optimize the length of a polymer molecule. In one embodiment, a spacer may be a polymer used in the art to optimize the length of a polymer molecule. In another embodiment, a spacer may be a hydrocarbon chain of certain length. For example, a spacer may be an alkyl chain (e.g., —$CH_2$—, —$CH_2CH_2$—, —$CH_2CH_2CH_2$—, —$CHCH_3CH_2$—, —$CH_2CH_2CH_2CH_2$—, —$CHCH_3CH_2CH_2$—, —$C(CH_3)_2CH_2$—, —$CH_2CH_2CH_2CH_2CH_2$—, —$CHCH_3CH_2CH_2CH_2$— or —$CH_2CH_2CH_2CH_2CH_2CH_2$—).

Example 1

The invention provides a method of chemically bonding a CL to at least a portion of a surface of an AMFC membrane at an interface between the CL and the portion of the membrane surface. The method includes formulating a catalyst ink for application to the portion of the membrane surface where the ink includes at least one ionomer and one or more compounds or agents containing one or more crosslinking groups. The ionomer and the one or more crosslinking compounds or agents are mixed at a pre-determined ratio when preparing the ink. The one or more compounds or agents include compounds having one or more crosslinking groups suitable for chemically linking of one or more ionomeric functionalities of the CL and the cell membrane, across the CL/cell membrane interface. Upon application of a catalyst ink of such formulation to at least a portion of the membrane surface, the crosslinking groups of the compounds or agents of the ink formulation preferably chemically bond to one or more ionomer functional groups in the cell membrane, thereby preferably establishing a well-bonded CL/membrane interface of low contact resistance. Similarly, the cell membrane may be formed from a formulation including one or more ionomeric materials and one or more chemical components having one or more crosslinking groups suitable for chemically linking to one or more ionomeric functionalities of the catalyst layer ink formulation.

The one or more compounds or agents of the catalyst ink formulation having crosslinking capacity may include, but are not limited to, diphosphines, triphosphines, monophosphine and diphosphines mixtures, diamines, triamines, monoamine and diamine mixtures, and any phosphine or amine having the general formula: (R1R2)X—R—X(R3R4) where X is P or N atom, R1 and R2, R3 and R4 are C1-C6 alkyl groups, independent of each other or which form a ring between each other; and R includes a "spacer" in the molecular structure and is selected to optimize the length of the polymer molecule. Examples of such compounds are e.g., hexaphenylbutanediphosphine (HPBDP), diethyl-dimethylbutane diamine (DEDMBDA) or other linear diamines. In addition, the one or more compounds or agents may include non-linear diphosphine or diamines, e.g., quinuclidine or diazabicyclooctane (DABCO), alone or in combination with a monoamine. Further, the one or more compounds or agents may also include, but are not limited to, triallyl cyanurate, trimethylolpropane triacrylate, pentaerythritol triallylether, pentaerythritol tetrallylether, etc.

Figure 3:
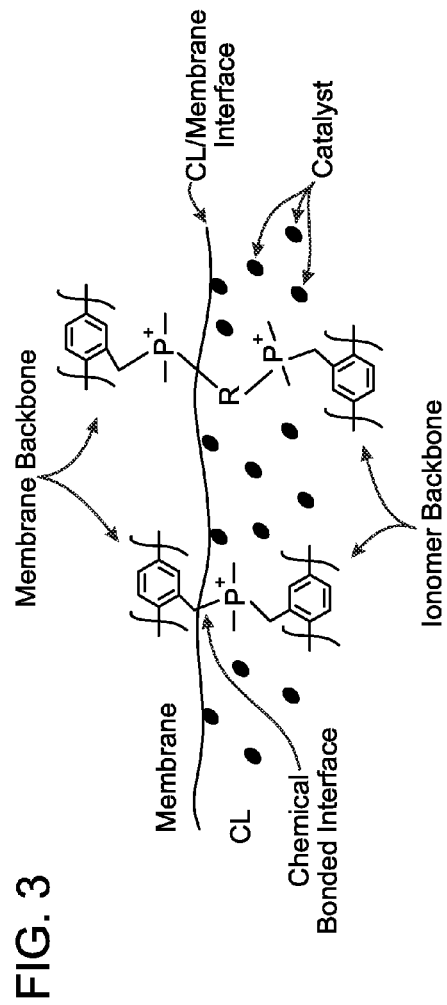
FIG. 3 is a schematic diagram of an example of a diphosphine crosslinked CL/membrane interface in an AMFC.

FIG. 3 shows a schematic diagram of a specific example of a diphosphine crosslinked CL/membrane interface in an AMFC.

Example 2

Figure 4:
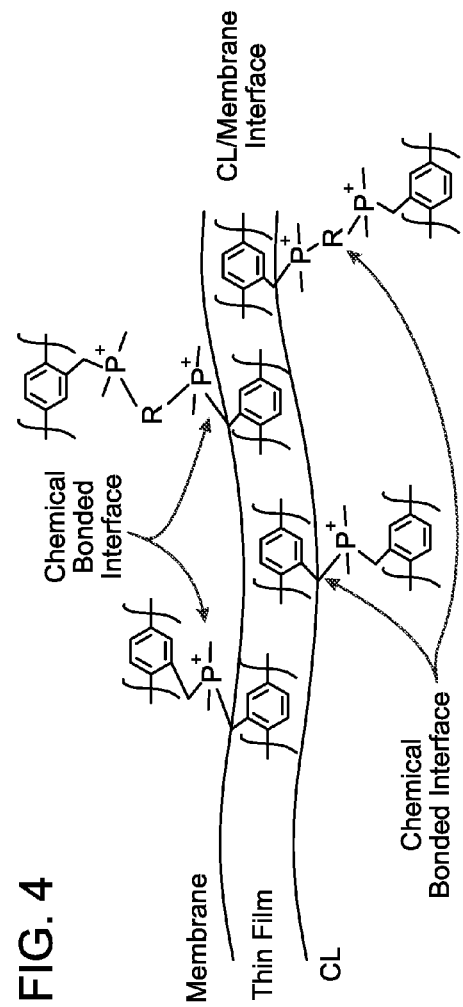
FIG. 4 is a schematic diagram of an example of a diphosphine crosslinked interface of CL and cell membrane through a crosslinked thin film.

A method includes formulating a thin surface film including at least one anion-conducting ionomer and containing one or more diphosphines, triphosphines, monophosphine and diphosphines mixtures, diamines, triamines, monoamine and diamine mixtures functional groups that facilitate crosslinking. The method can further include applying or casting the thin film onto at least a portion of the surface of the cell membrane before application of a catalyst ink formulation to the membrane surface to form a CL along the membrane surface. The thin film may have a thickness ranging from about 0.02 micrometer to about 1 micrometer, and preferably about 0.1 micrometer. The functional groups may be provided by any of the compounds or agents described above in Example 1. The method can further include applying or casting the catalyst ink formulation onto at least a portion of the surface of the membrane pre-covered by the thin film. Bonding between the CL and the membrane surface is achieved by cross-linking functional groups in the thin film with functional groups located at the surface of the membrane and the surface of the CL adjacent the thin film. The ionomer formulations and chemical structure of the CL and the cell membrane thereby remain practically unmodified despite such crosslinking and any undesirable effects of crosslinking on the ionic conductivity through the thickness of the CL and the cell membrane are minimized or prevented. FIG. 4 shows a schematic diagram of a specific example of a diphosphine crosslinked interface of CL and cell membrane through a crosslinked thin film.

Example 3

A method includes formulating a thin surface film as described above in Example 2. Applying or casting the thin film onto a portion of the membrane surface is preferably followed by applying or casting a catalyst ink which includes an ionomer mixed at a pre-determined ratio with one or more compounds or agents containing one or more cross linking capable groups, suitable for chemically linking with one or more ionomeric functions, of the ionomeric material(s) in the thin film. Crosslinking can occur at the interfacial contact between the catalyst ink and the thin film.

Example 4

Figure 5:
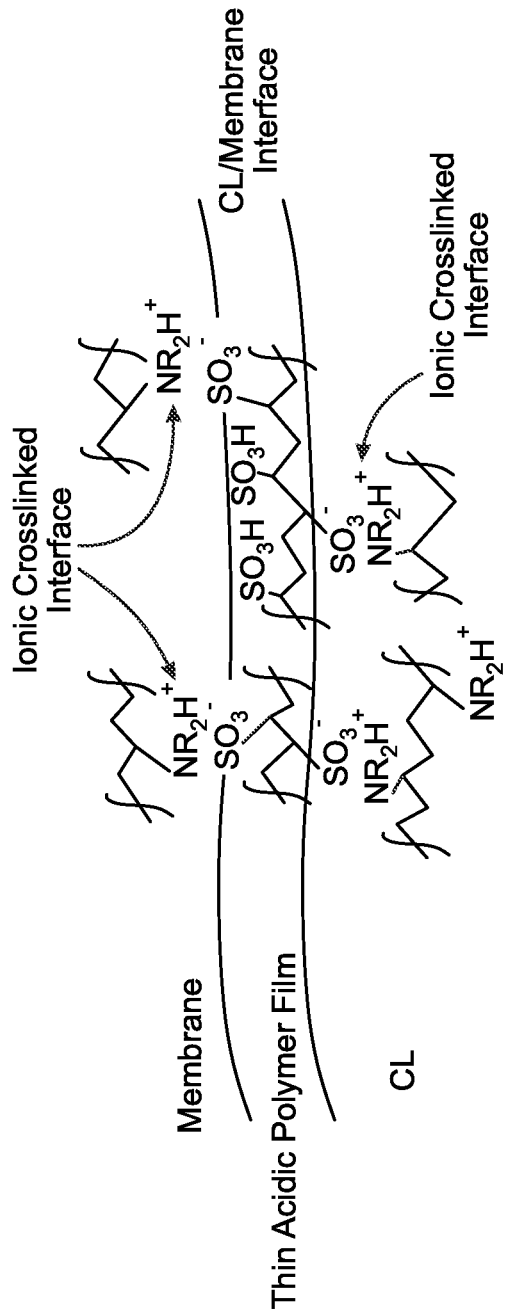
FIG. 5 is a schematic diagram of an example of a diphosphine crosslinked CL/membrane interface, established through a crosslinked, thin polymer film of acidic functions.
Figure 6:
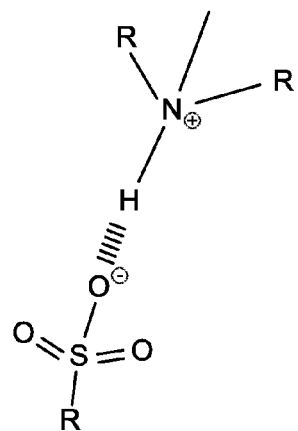
FIG. 6 shows an exemplary ionic crosslinking effect based on the ionic force of attraction between a negative sulfonate ion and a positive tetra alkyl ammonium ion interacting at the CL/cell membrane interface.

A method includes formulating a thin surface film as described above in Example 2; however, the cross linking functionality can be provided by an acidic polymer. The acidic polymer may include, but is not limited to, Nafion® or other molecule having the general formula: Ac1-R-Ac2, where Ac1 and Ac2 are acidic functional groups, such as, for instance, —COOH, —SO3H, or other acidic group. Ac1 and Ac2 can be the same or different groups. The method includes applying or casting the thin film onto at least a portion of the surface of the cell membrane before application of a catalyst ink formulation to the thin film-covered membrane surface. Application of the thin film results in an acid-base reaction at the interface of the thin film and the cell membrane. The reaction occurs between the $OH^-$ ions of the alkaline ionomer of the cell membrane and the $H^+$ ions of the acidic polymer of the thin film. The acid-base reaction can result in electrostatic bonds between the quaternary phosphonium $R_3HP^+$ ions (or the quaternary ammonium $R_3HN^+$ ions) in the anion conducting ionomer of the cell membrane and, for instance, the $SO_3^-$ ions or $COO^-$ ions of the acidic polymer of the thin film. After application of the thin film, the method includes applying the catalyst ink formulation to the thin film. Similarly, an acid-base reaction can result at the interface of the thin film and catalyst layer, between the $OH^-$ ions of the CL ionomer and the $H^+$ ions of the acidic polymer contained in the thin film to produce electrostatic bonds between $R_4P^+$ ions or $R_4N^+$ ions in the anion conducting ionomer and the $SO_3^-$ ions or $COO^-$ ions of the acidic polymer. The acidic polymer of the thin film thereby has the capacity to "tie" the surface of the CL to the surface of the cell membrane, by the electrostatic bonds formed at the interfaces between the thin film and cell membrane and the thin film and CL. FIG. 5 shows a schematic diagram of a specific example of a diphosphine crosslinked CL/membrane interface, established through a crosslinked, thin polymer film of acidic functions. FIG. 6 shows the specific ionic crosslinking effect based on the ionic force of attraction between a negative sulfonate ion and a positive tetra alkyl ammonium ion interacting at the CL/cell membrane interface.

Example 5

Figure 7:
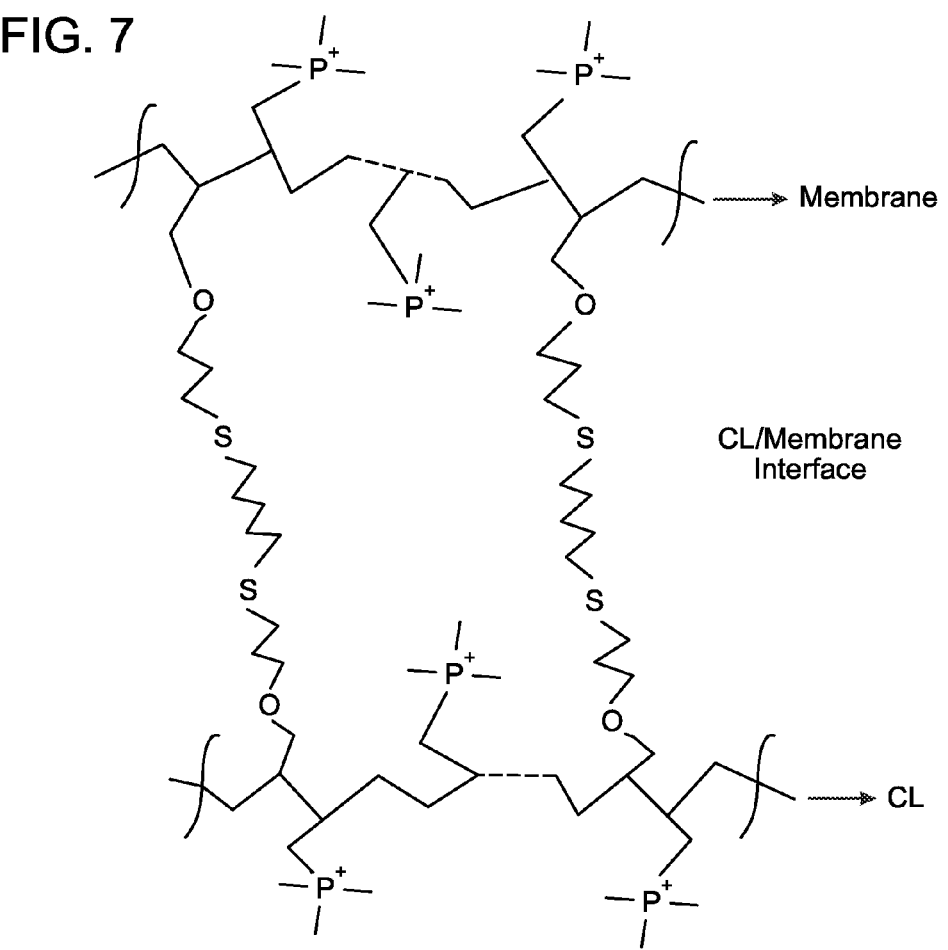
FIG. 7 is a schematic diagram of an example of a UV crosslinked interface of quaternary phosphonium based CL and cell membrane, using diercaptohexane as crosslinking agent.

A method includes formulating a thin surface film including UV absorbing functions provided by compounds having one or more UV sensitive groups. UV sensitive groups can include, for instance, UV initiators, as components of the thin film composition that facilitate UV-induced cross linking. Such UV sensitive groups can include, but are not limited to, epoxy or/and acrylate groups, e.g., of standard UV curing material(s) or unsaturated esters used in UV-curing adhesive technology, e.g., glycidylmethacrilate, pentaerylthritol triallylether, triallyl cyanurate, allylpentaerythritol (APE) and/or diercaptohexane (hexanedithiol), mixed with an appropriate photo initiator, e.g., 2-Hydroxy-2-methyl-1-phenyl-propan-1-one (Darocur® 173), Phenylglyoxylate (Darocur MBF®), benzophenone (Darocur BP®), 2-hydroxy-1-[4-(2-hydroxyethoxy)phenyl]-2-methyl-1-propanone (Irgacure® 2959), etc. The method can include applying or casting the thin film with UV sensitive groups onto at least a portion of the surface of the cell membrane before application of a catalyst ink formulation to the thin film-covered membrane surface. The crosslinking agent and UV initiator are added in low concentrations, for example <20 wt % and more preferably less than 5 wt % of the polymer content during thin-film casting. Subsequent to application of the thin film, the method can include applying the catalyst ink formulation onto the thin film and thereafter applying UV radiation to the membrane, the catalyst layer and the thin film. The exposure to UV can be for a few minutes, preferably for less than 10 minutes. UV radiation can facilitate cross linking of the UV sensitive groups in the thin film thereby preferably establishing chemical bonding of the CL to the surface of the membrane via the thin film. Applying UV radiation may include irradiating the cell membrane with UV radiation from the side of the membrane that has not been catalyzed. UV radiation absorption by the membrane is typically less than absorption by the metal-containing CL. Therefore, sufficient UV energy will hit the interface of the CL and the cell membrane and thereby trigger advantageously the cross linking between the CL and the membrane to chemically bond the CL and the membrane across the interface. One advantage of UV-induced cross linking as described is that such cross linking can be achieved at low temperatures, e.g., room temperatures, and such process can thereby avoid any degradation of temperature-sensitive polymers. FIG. 7 shows a schematic diagram of a specific example of a UV crosslinked interface of quaternary phosphonium based CL and cell membrane, using diercaptohexane as crosslinking agent.

Example 6

A chemical composition of the catalyst ink and/or of the cell membrane may include one or more UV initiators to introduce the precursor functionalities of UV-induced cross linking as described above. Bonding at the interfacial contact of the catalyst ionomer and the cell membrane is achieved with application of UV radiation after the catalyst ink formulation has been applied to at least a portion of the surface of the cell membrane to form the CL.

Example 7

A method includes applying or casting onto at least a portion of the surface of the cell membrane a thin film containing one or more compounds providing UV-induced cross linking functionalities and one or more UV initiators as described above in Example 5. The method can further include applying a catalyst ink formulation as described in Example 6, including one or more UV initiators intermixed with the one or more ionomers of the catalyst ink formulation to introduce UV-induced cross linking functionalities. The method can include applying or casting the catalyst ink formulation onto the thin film and thereafter applying UV radiation to facilitate UV cross linking.

Example 8

Figure 8:
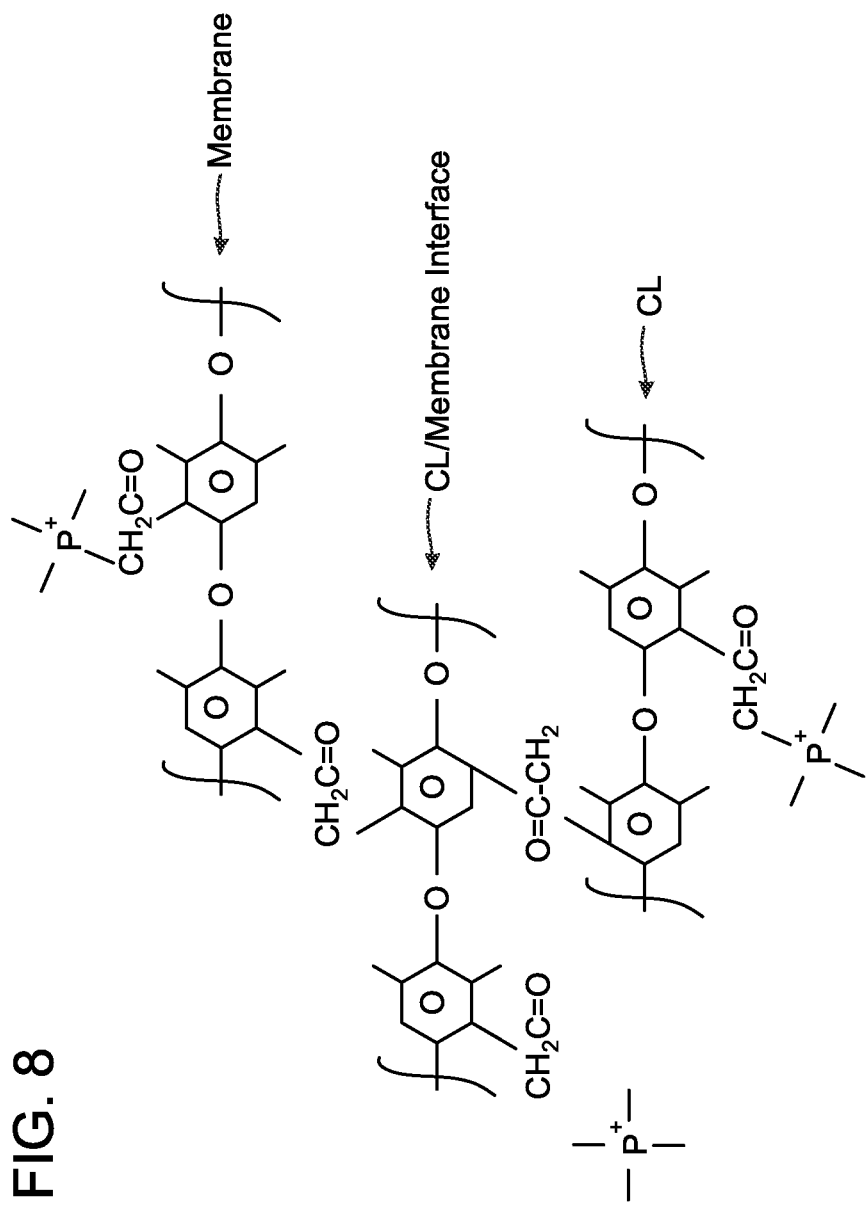
FIG. 8 is a schematic diagram of an example of an interface involving a CL and membrane with quaternary phosphonium cations, using chloroacetyl groups as thermal crosslinking agent.

A method includes formulating a thin surface film including at least one anion-conducting ionomer and containing one or more compounds having constituents that provide thermal cross linking upon heating. The method can also include applying or casting the thin film onto at least a portion of the surface of the cell membrane before application of a catalyst ink formulation to the thin-film covered membrane surface. Such one or more compounds having constituents that provide thermally induced cross linking include polymers suitable for functionalizing with anionic groups, while remaining stable in mild alkaline environments, and for achieving thermal cross linking and bonding at relatively low temperatures, such as, for instance, temperatures within a range of from about 25° to about 120° C. For example, one such polymer is polyphenyleneoxide (PPO), either chloroacetylated, bromomethylated or aminated to form a polysulfone-based polymer ionomer with $OH^-$ ion conductivity. In contrast to the ionomer, PPO can be cross linked at temperatures of a range from about 60° C. to about 90° C. FIG. 8 shows a schematic diagram of a specific example of an interface involving a CL and membrane with quaternary phosphonium cations, using chloroacetyl groups as thermal crosslinking agent.

Example 9

A method includes formulating the cell membrane composition as a blend of one or more polymers configured for thermal cross linking in response to applications of heat and one or more ionomers configured for $OH^-$ ion conductivity. The composition of the cell membrane in this embodiment can provide advantageous separate control of the membrane's conductivity and the degree of crosslinking.

The methods according to the invention include forming or constructing membrane electrode assemblies (MEAs) for use in AMFCs including catalyst coated membranes (CCMs) as described in the above examples and further including gas diffusion layers (GDLs). In addition, the invention is not limited to the methods and processes disclosed herein and it is envisioned that the invention embodies and encompasses MEAs, CCMs and AMFCs including one or more of the cell membranes, thin films, and catalyst layers as described in the above examples.

Other embodiments are within the scope and spirit of the invention.

Having thus described at least one illustrative embodiment of the inventions, various alterations, substitutions, modifications and improvements in form and detail will readily occur to those skilled in the art without departing from the scope of the inventions. Such alterations, substitutions, modifications and improvements are intended to be within the scope and spirit of the inventions. Other aspects, functions, capabilities, and advantages of the inventions are also within their scope. Accordingly, the foregoing description is by way of example only and is not intended as limiting.

In addition, in describing aspects of the invention, specific terminology is used for the sake of clarity. For purposes of description, each specific term is intended to at least include all technical and functional equivalents that operate in a similar manner to accomplish a similar purpose. In some instances where a particular aspect of the invention includes a plurality of system elements or method steps, those elements or steps may be replaced with a single element or step; likewise, a single element or step may be replaced with a plurality of elements or steps that serve the same purpose. Further, where parameters for various properties are specified herein for aspects of the inventions, those parameters can be adjusted or rounded-off to approximations thereof within the scope of the invention, unless otherwise specified.

It is noted that one or more references are incorporated herein. To the extent that any of the incorporated material is inconsistent with the present disclosure, the present disclosure shall control. Furthermore, to the extent necessary, material incorporated by reference herein should be disregarded if necessary to preserve the validity of the claims.

Further, while the description above refers to the invention, the description may include more than one invention.

What is claimed is:

1. An alkaline membrane fuel cell comprising:
   a catalyst coated $OH^-$ ion conducting membrane having a catalyst layer and an $OH^-$ ion conducting membrane comprising a hydrocarbon backbone with C1-C6 alkyl side chains and a cation bonded to the side chain enabling OH— ion conduction, wherein the catalyst layer is directly chemically bonded to a surface of the membrane, via covalent bonding, wherein the covalent chemical bonding is established by crosslinking of polymer constituents across an interface between the at least one catalyst layer and the membrane;

wherein an overall crosslinking region includes at least some volume of each of the catalyst layer and the membrane, and wherein the catalyst layer comprises compounds or agents having one or more crosslinking groups that form chemical bonds with one or more ionomeric functionalities of both the catalyst layer and the ion conducting membrane.

2. The alkaline membrane fuel cell of claim 1, wherein the cations in the conducting membrane include at least one of quaternary phosphonium and quaternary ammonium groups.

3. The alkaline membrane fuel cell of claim 1, wherein the crosslinking is established using diphosphines, triphosphines, monophosphine and diphosphines mixtures, diamines, triamines, monoamine and diamine mixtures, and any phosphine or amine having the general formula: (RlR2)X—R—X(R3R4) where X is a P or N atom, Rl and R2, R3 and R4 are C1-C6 alkyl groups, independent of each other or forming a ring with each other; and R includes a spacer in the molecular structure selected to optimize the length of the molecule.

4. A membrane electrode assembly for alkaline membrane fuel cell including the catalyst coated membrane of claim 1 and a pair of gas diffusion layers, wherein the catalyst coated membrane is prepared as set forth in claim 1.

5. An alkaline membrane fuel cell stack including a plurality of membrane electrode assemblies as set forth in claim 4.

* * * * *